United States Patent [19]

Kumar et al.

[11] Patent Number: 4,941,081
[45] Date of Patent: Jul. 10, 1990

[54] INTERRUPT ZONE IN RUNG OF LADDER PROGRAM IN PROGRAMMABLE CONTROLLER

[75] Inventors: Shalabh Kumar, Kildeer; Duane S. Edgar, Schaumburg, both of Ill.

[73] Assignee: Microfast Controls Corp., Carol Stream, Ill.

[21] Appl. No.: 140,069

[22] Filed: Dec. 31, 1987

Related U.S. Application Data

[63] Continuation-in-part of Ser. No. 46,229, May 4, 1987, Pat. No. 4,839,789.

[51] Int. Cl.⁵ .................. G06F 15/46; G05B 19/00
[52] U.S. Cl. .................... 364/140; 364/142; 364/147; 364/900; 364/926.9; 364/949; 364/941.1
[58] Field of Search .............. 364/140-147, 364/200 MS File, 900 MS File

[56] References Cited

U.S. PATENT DOCUMENTS

| | | | |
|---|---|---|---|
| 4,247,909 | 1/1981 | Bradley et al. | 364/147 X |
| 4,441,161 | 4/1984 | Sasaki et al. | 364/147 X |
| 4,510,565 | 4/1985 | Dummermuth | 364/147 X |
| 4,621,317 | 11/1986 | Kudo et al. | 364/147 |
| 4,623,961 | 11/1986 | Mackiewicz | 364/147 |
| 4,638,452 | 1/1987 | Schultz et al. | 364/900 |
| 4,683,549 | 7/1987 | Takaki | 364/147 X |
| 4,703,414 | 10/1987 | Inoue | 364/147 |
| 4,742,443 | 5/1988 | Rohn et al. | 364/136 |

OTHER PUBLICATIONS

Allen-Bradley-"Single Channel Programming for the Analog Input Module"-Publication 1771-920, Jun. 1980; pp. 1-19.

*Primary Examiner*—Joseph Ruggiero
*Attorney, Agent, or Firm*—Thomas R. Vigil

[57] ABSTRACT

The method and device are used to control outputs to a plurality of output devices relative to inputs and for synchronizing the updating of selected outputs with the occurrence of an external event. An interrupt signal is derived from an external event at one or more input devices and supplied to a micro-computer. A user ladder program is provided in the device for controlling the outputs and one or more interrupt zones are provided in the ladder program and are immediately responsive to the interrupt signal for instantaneously updating selected outputs. Each interrupt zone includes enabling means, an opening boundary, addresses of inputs to be fetched, a body of instructions and a closing boundary.

10 Claims, 7 Drawing Sheets

1

INTERRUPT ZONE IN RUNG OF LADDER PROGRAM IN PROGRAMMABLE CONTROLLER

CROSS-REFERENCE TO RELATED APPLICATIONS

This application is a Continuation-in-Part of our prior copending application Ser. No. 046,229, filed May 4, 1987, for: PROGRAMMABLE CONTROL DEVICE FOR HIGH SPEED PROCESSING OF DATA.

BACKGROUND OF THE INVENTION

1. Field of the Invention

The present invention relates to a method and device for controlling outputs to a plurality of output devices relative to inputs and for synchronizing the updating of selected outputs with the occurrence of an external event. The method and device utilize and include the derivation of real-time interrupt signals from external events, the interrupt circuitry, and the programming of an interrupt zone in a ladder program with special instructions which are incorporated into a programmable control apparatus that is used to control industrial processes and production machinery.

A programmable control device uses as its inputs the states of switch-type devices and the input of numerical data from various sources, such as, but not limited to: position transducers, pressure sensors, liquid flow or passage of time. From these inputs, along with the user's program, the programmable control device computes logical outputs in the form of electronic switch outputs and also computes data for output to various locations. These switch outputs typically cause the starting and stopping of desired functions at predetermined times and locations during a machine cycle or a production process.

According to the teachings of the present invention, interrupt signals are derived from the transitions of the input parameters that the programmable control device uses to continuously control a plurality of output parameters, that, in turn, control a machine or a process. The interrupt signals cause the programmable control apparatus to briefly stop the execution of its normal program and to execute instead, other programs that occur in various types of specially created interrupt zones. When execution of this special interrupt program has been completed, the normal program resumes its execution. The special interrupt program instantaneously executes a group of normal program instructions in one or more interrupt zones upon the occurrence of an interrupt signal.

2. Description of the Prior Art

Prior methods for providing control signals to the desired outputs have generally operated by sequential analysis of a ladder logic diagram or program. In general, a ladder logic diagram is both read and executed from left to right and from the top down to the end of the machine or process control program. Each line of the ladder program is called a rung. The ladder diagram instructions fall into two general types of instructions: switch (bit) and data (word). There are individual instructions for input or output that operate on bits or words. Each ladder instruction refers to either a bit or a word of memory. In general, with bit instructions, each input instruction on a rung is evaluated to be either true or false. If the logical result of the input instructions are true, then the single allowable output instruction on the rung is also true. The particular bit in memory to which the output instruction refers is then changed to reflect the logical result of the input instructions.

Two special areas in a programmable control device's memory are reserved to coincide with the physical inputs and outputs. These are called an input status section and an output status section, respectively. In a prior art programmable control device, the logical condition of the data from all of the inputs is placed in the input status section. The programmable control device then sequentially and serially scans each logical condition, one at a time, and transfers the resultant bits and data to its output status section and then to the physical output devices.

The total time to process one ladder, i.e., the scan time, is dependent upon the number of logical decisions to be processed and a large number of decisions requires a longer scan time. This approach has been used successfully by the prior art control devices in many applications.

However, where extensive calculations or higher speeds have been required, these prior control devices have proven to be too slow for the machinery they are controlling.

Heretofore, various programmable control devices have only sampled their plurality of inputs from time to time for the purpose of continuously controlling a plurality of outputs in dependence on the input conditions. If an external input is changing significantly more rapidly than the programmable control device's scan time, the ladder programmer would place Immediate Input Instructions and other control action rungs dependent upon the state of the inputs in various places in the ladder program. However, more than a few Immediate Input Instructions in a ladder program are impractical because of program memory size constraints and unnecessary additional scan time.

As will be described in greater detail hereinafter, the method and device of the present invention utilizing interrupts, interrupt programming zones, and the derivation of the interrupt signal from the transitions of various input conditions, differ from the previously proposed method of synchronization of control outputs to input conditions in that the programmable control device of the present invention is truly synchronized to an external event rather than expending scan time doing comparison of the present states of its inputs to their prior states.

Greater control precision is also obtainable with the method and device of the present invention due to a much more rapid reaction of the programmable control device.

SUMMARY OF THE INVENTION

According to the teachings of the present invention an interrupt zone is placed in a user's ladder program in a programmable control device to attain a high speed of response to changes in input states (such as the change in an input signal which signifies the presence of an object). An interrupt zone includes an opening boundary that allows a qualification input signal or logical combination of various input signals and internal machine states for the purpose of enabling the execution of the zone program, a body of instructions to be executed if the interrupt zone is enabled by such qualifications when an interrupt signal occurs, and a closing boundary. When an interrupt signal is coupled to the programmable control device and one or more interrupt zones are enabled, the data from an input module address contained in the interrupt zone instruction is fetched into an input status section of the device, the programmed instructions contained in the interrupt zone are executed, output status section of the device are updated, and only the affected output data are coupled to the output devices.

One example of the usefulness of an interrupt zone is in counting applications where the count rate to a counter that is internal to the programmable control device is more rapid than the execution time of the ladder program or where too many immediate input instructions would be required to perform the same function than would be practical. In such cases, the output of a presence sensor used to detect the objects being counted is wired to an interrupt input. When the leading edge of each object is sensed, the programmable control device is interrupted and the count of the objects can be incremented.

An interrupt signal is derived from any of the logical transitions of each of the various programmable control device's several input signals. The interrupt signal is used to temporarily halt the normal execution of the ladder program to allow the execution of the program or programs in one or more interrupt zones. The programs in the interrupt zones are not executed during the execution of the normal ladder program. However, any instructions that are allowed in the normal program execution are allowed in an interrupt zone.

DESCRIPTION OF THE PREFERRED EMBODIMENT

Figure 1:
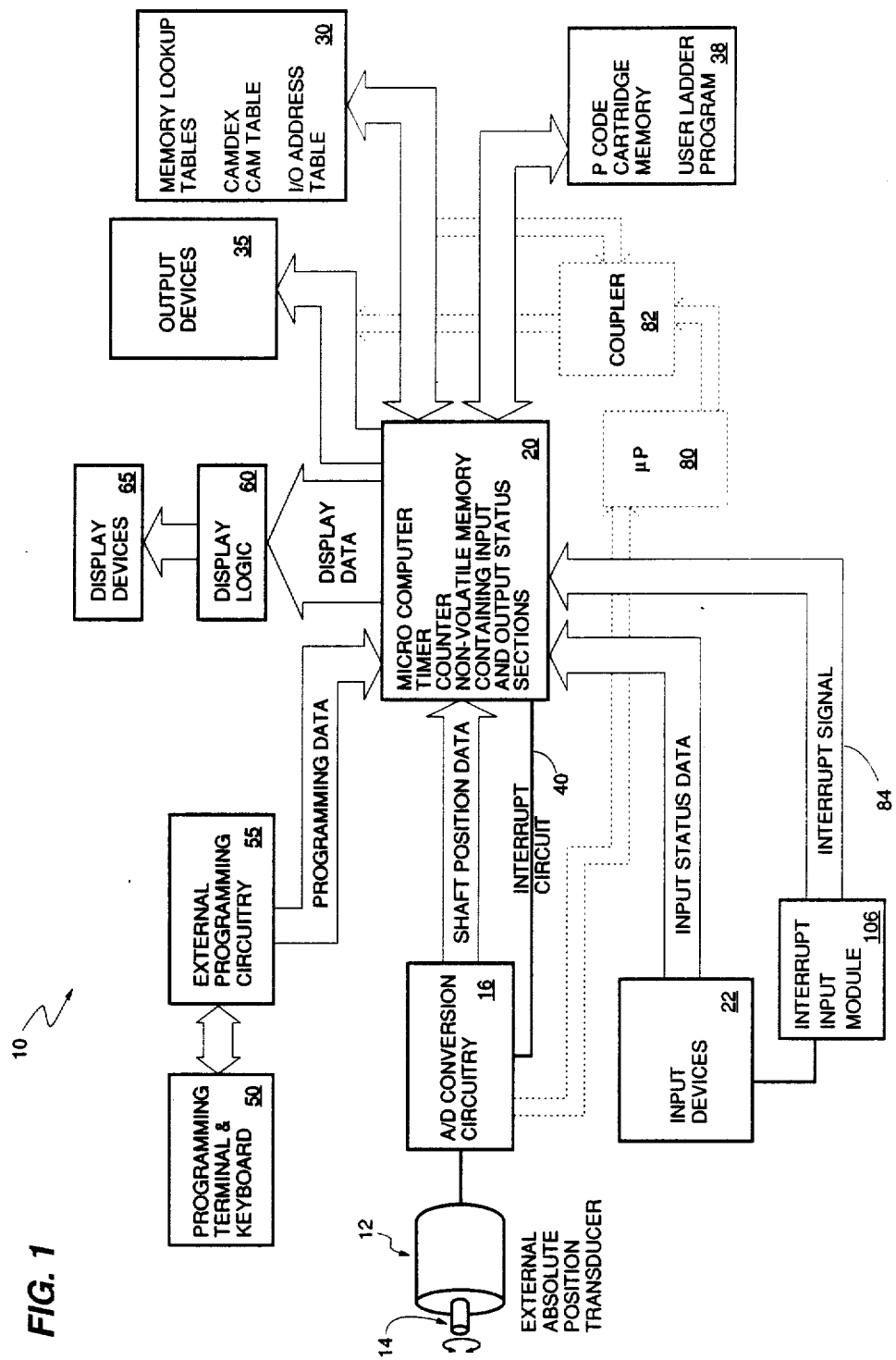
FIG. 1 is a block diagram of one embodiment of the programmable control device of the present invention which includes a position transducer, a micro-computer, output devices, lookup tables, input devices and an interrupt therefrom and shows the interconnections of the circuit elements and of the interrupt signal from an- input device to the micro-computer.

Referring now to the drawings in greater detail, there is illustrated in FIG. 1 a block diagram of a programmable control device 10 constructed according to the teachings of the present invention. The device 10 includes a position transducer 12 having a shaft 14 arranged to be mechanically coupled to a machine shaft. Of course, other control inputs such as from a pressure transducer, a liquid flow sensor or the passage of time can be used. The transducer 12 is typically arranged to provide an analog signal which is converted to a digital format by a ratiometric tracking converter or A/D conversion circuitry 16. A typical position transducer 12 mounted on a machine shaft may comprise a resolver encoder of the type sold under Model No. RL100 by Autotech Corporation of Carol Stream, Ill. The conversion circuitry 16 is provided to generate a digital representation of the transducer output for input to a micro-computer (processor or controller) 20.

The control device 10 accesses and retrieves data from the lookup tables 30 and the micro-computer 20 is used to update its I/0 status sections in accordance with instructions in the user program and to update internal memory of the micro-computer.

The lookup table 30 includes a Camdex table for memory locations and a Cam Table which includes a unique set of outputs for individual output devices 35 for any given set of input conditions. For multiple outputs there is provided a sequential array of output data corresponding to an array of the output devices 35.

In one embodiment of the device 10 of the present invention there is provided a memory device 38 containing the user program which is executable by the micro-computer 20. This memory is programmed with a group of user instructions having operation codes, configuration data for the programmable control device, offset data, rate offset data, on/off set points and cam numbers, and input and output addresses. The code accessed within this memory is hereinafter referred to as P-code and provides a condensed version of the user program for the micro-computer 20.

The P-code is converted to an executable routine in response to the user program and identified input conditions, and is hereinafter referred to as Q-code. In operation of the system under control of the Q-code, the user program is executed. Any change in input conditions which will, in turn, modify the data in Camdex, Cam Table, or I/0 address table will cause a rapid alteration of these tables to suit the new conditions.

In the control device 10 of the present invention, each time the data from the transducer 12 changes value the processing of the normal ladder program is interrupted by an interrupt signal on an interrupt circuit 40 and the numerical output of the transducer 12 is read.

A module or cartridge 44 is included in the memory device 38 which is user programmable and contains the P-code. This is programmable through a programming terminal 50 and external programming circuitry 55 shown in FIG. 1. This cartridge 44 is designed to be removably connected to the micro-computer 20 for convenient interchange of cartridges and therefore also user programs. The memory in this cartridge is preferably of the non-volatile type such that setpoint information and programs are retained without power. This permits preprogramming of various cartridge memories to provide spare modules for backup or programming changes.

Display logic circuitry 60 and associated display devices 65 are connected to the micro-computer 20 to indicate the numerical value of the position transducer and diagnostic conditions of the micro-computer 20.

This display logic circuitry 60 is under the control of the micro-computer 20 and the P-code cartridge and can therefor be customized by the user program in the P-code cartridge.

Instead of controlling the interrupt 40 and coupling of the addressable tables with a position transducer 12, one can utilize a predetermined time period. Also, one can use a second micro-computer 80, shown in phantom in FIG. 1, for controlling the interrupt and coupling of the tables 30 to the output devices 35 while the micro-computer 20 cycles through the input data in the ladder program and periodically updates the tables 30 as required. For this purpose, the micro-computer 80 is coupled between the conversion circuitry 16 and a controllable coupling device 82. Then the micro-computer 80 controls the coupling device 82 for timely coupling of the lookup tables to the output status section as well as the output devices 35. In this modified embodiment, the interrupt circuitry 40 between conversion circuitry 16 and micro-computer 20 would be omitted.

According to the teachings of the present invention, an interrupt signal 84 is coupled between one or more input devices 22 and the micro-computer 20 for synchronizing the updating of one or more selected outputs with an external event, such as the sensing of the presence of one of a plurality of objects being counted at a predetermined location.

Figure 2:
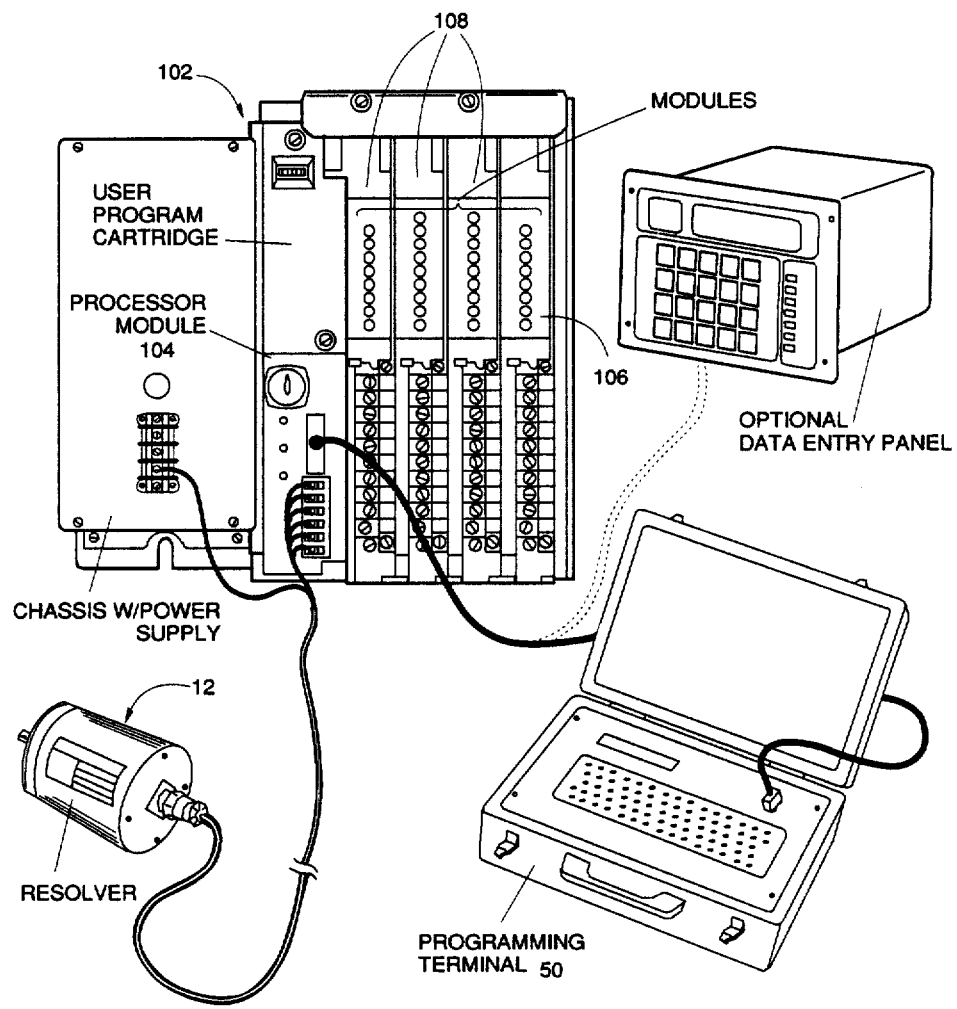
FIG. 2 is a layout of the components of the device shown in FIG. 1 and shows a housing mounting a processor (micro-computer) module and a user program cartridge, a position transducer, and various input and output modules received in the housing.

In FIG. 2 is shown a housing 102 which includes a power supply for providing power to a processor module 104, at least one interrupt input module 106, and output modules 108. The housing 102 also provides receptacles for the various signal and power interconnections. The interrupt input module 106 and the output modules 108 are easily insertable or removable from the housing 102 and are easily connected or disconnected from the machine or process being controlled by the use of removable wiring connectors which retain the input and output wiring while being easily removed or inserted from the modules. Each interrupt input module 106 will couple at least eight input signals and one interrupt signal to the processor module 104.

Figure 3:
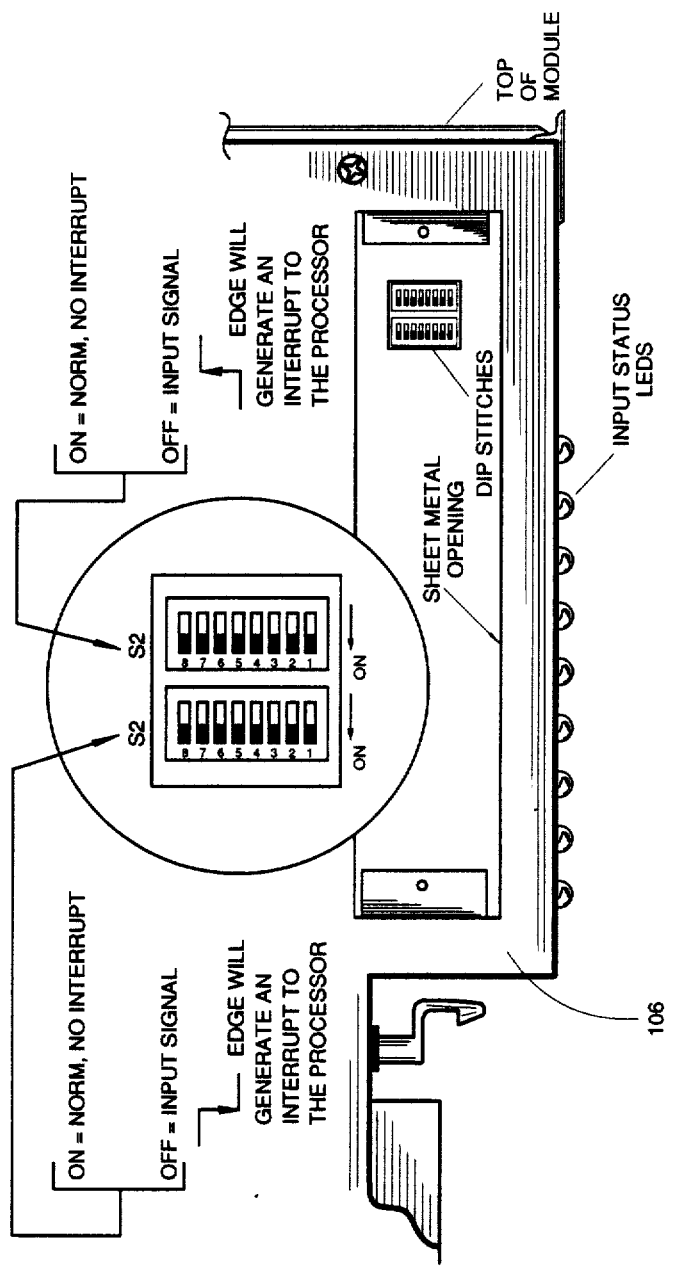
FIG. 3 is a plan view of a portion of an interrupt input module and shows how the module can be programmed to provide an interrupt signal from its various input signals and transitions thereof.

A portion of one interrupt module 106 is shown in FIG. 3.

Figure 4:
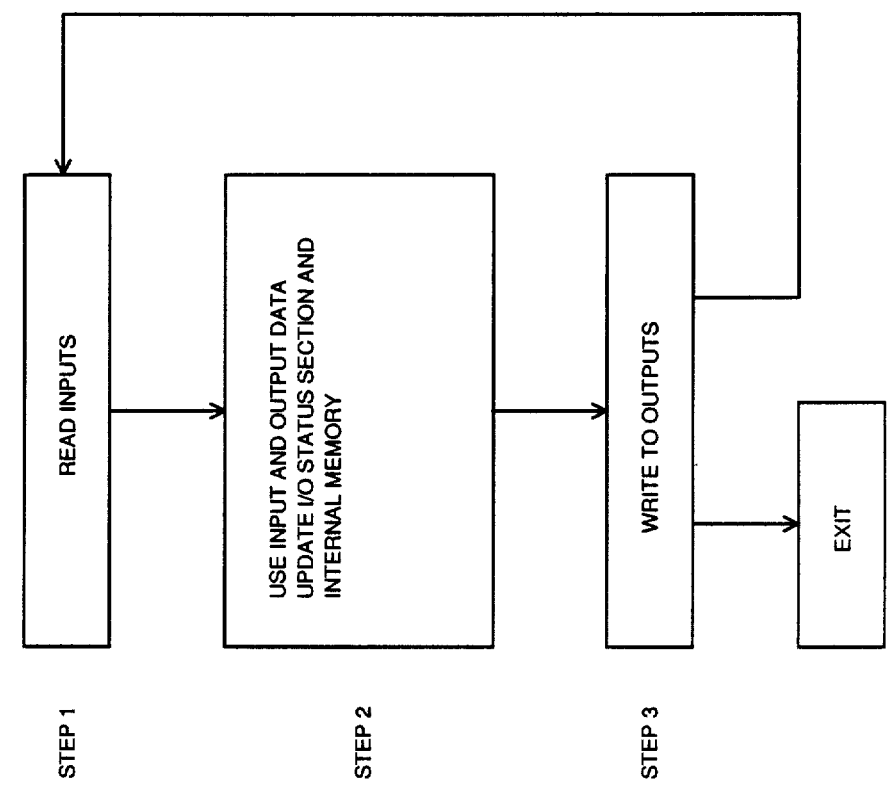
FIG. 4 is a flow diagram of the basic operation of the control device, of the present invention shown in FIGS. 1 and 2.

Referring now to FIG. 4 there is shown the basic flow chart of operation of the micro-computer 20 when executing the normal ladder program.

In Step 1 the micro-computer 20 is instructed to read the machine inputs including status information from position input devices 22.

In Step 2 the input data read in Step 1 and the output data calculated by the processor of the micro-computer 20 is used to update its I/0 status sections in accordance with instructions in the ladder program and to update internal memory of the micro-computer 20.

In Step 3 the micro-computer writes the data from the I/0 status sections to the output devices. The system then loops back to the beginning until finally instructed to exit.

Figure 5:
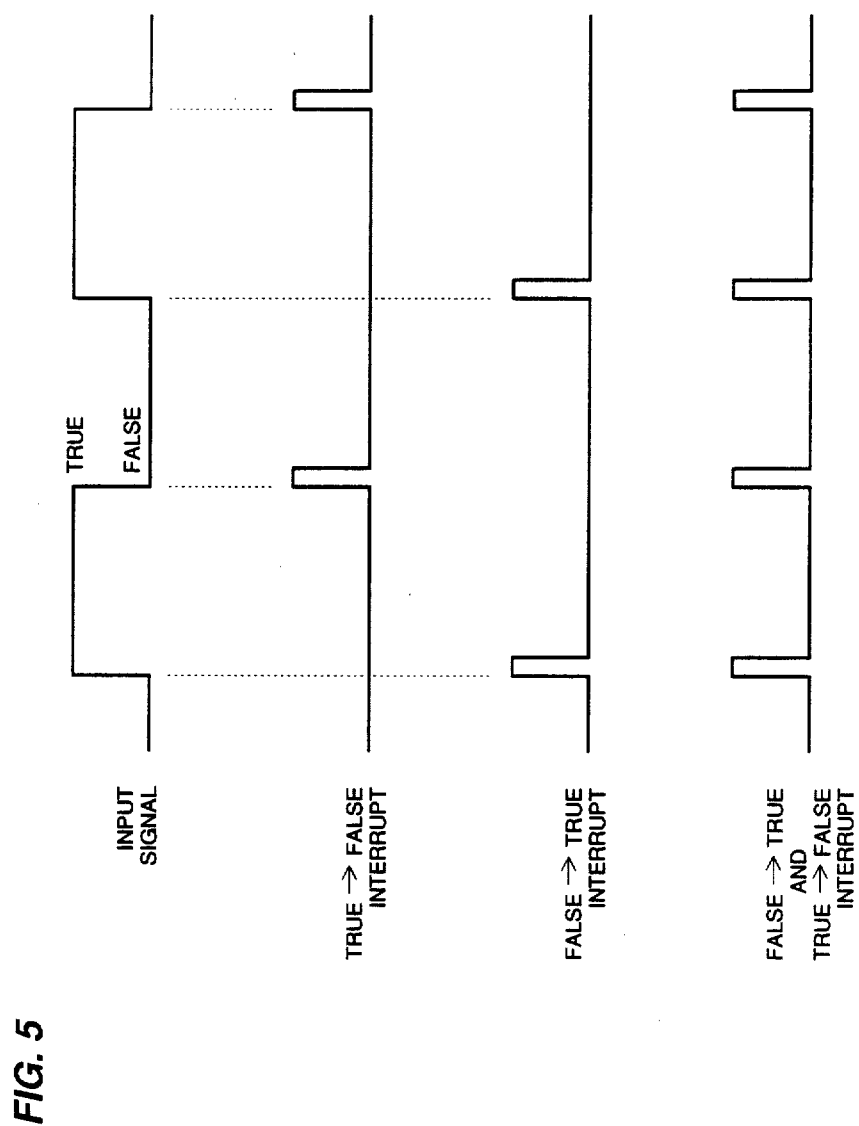
FIG. 5 is a timing diagram showing the change of state of a typical input signal and the various occurrences of interrupt signals that can be derived from these input signal transitions.

FIG. 5 shows the logical transitions of a typical input signal and the timings of the interrupt signals that can be derived therefrom. The transition of the input signal from off to on is called a positive transition and the transition from on to off is called a negative transition.

Connections and switches are provided on the interrupt input module 106 connected to input device 22 to generate an interrupt output signal 84 from the module 106 to the processor module 104 for each input signal's positive or negative transitions depending upon the switch settings on the interrupt input module 106 (FIG. 3). The interrupt output signals from each interrupt input module 106 are wired together in the housing 102 in a logical OR arrangement and are then coupled to the processor module's 104 interrupt input pin.

Figure 6:
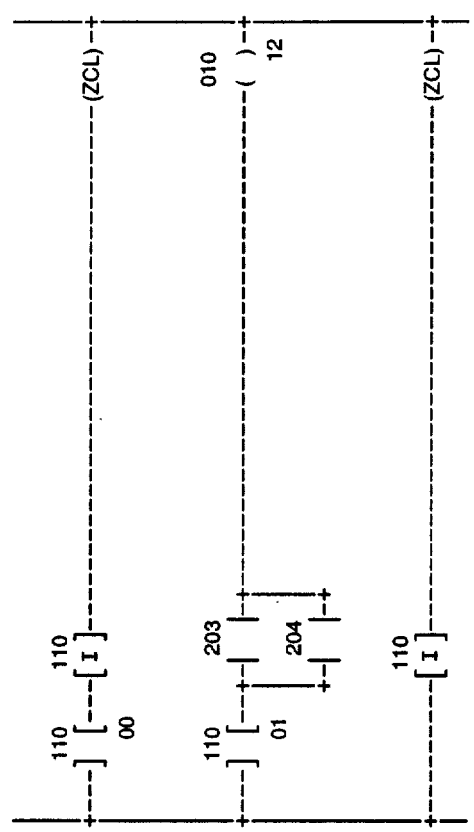
FIG. 6 is a graphic representation of an interrupt zone program showing the opening boundary with qualification instructions, the body of the instructions to be executed during the interrupt period, and the closing boundary.

When an interrupt signal occurs on any programmed input on any input module 106, the processor module's 104 circuitry uses the interrupt input module address contained in the zone's instructions as shown in FIG. 6 to fetch the input data from that input module's address and to place that data into an internal input status section. This timely data can then be used to execute instructions found in the enabled interrupt zone's programs in line 2. If an interrupt zone's program is being executed, the data from each output instruction is collected in an output status section and when all enabled interrupt zone programs have completed their execution the specific output status sections that have been altered are output to the output modules 108.

A zone enable is indicated at 110/] [/00.

The opening boundary of the interrupt zone is indicated at 110/[I].

The name of the zone instruction is indicated at [ZCL]at the end of line 1.

The logic conditions are shown at the beginning of line 2 and the immediate switch event - turning on or turning off an output is indicated at the end of line 2.

The closing boundary of the interrupt zone is indicated at line 3 and the identity of the interrupt zone being closed is indicated at the end of line 3.

Figure 7:
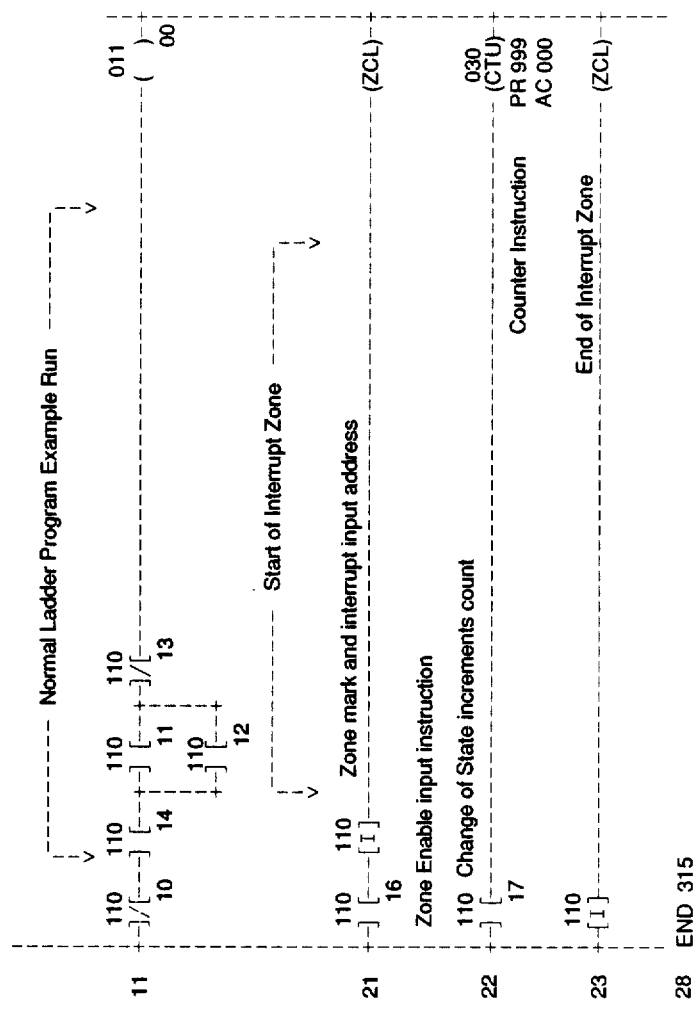
FIG. 7 is a graphic representation of part of a ladder program including an interrupt zone which can be used by the programmable control device shown in FIGS. 1 and 2 for generating control signals.

Part of a ladder program including an interrupt zone is illustrated graphically in FIG. 7. Here line 11 is a typical rung of the ladder program.

Line 21 is the start of an interrupt zone and includes an opening boundary 110/] [/16; 110/[I], and a zone enabling or qualification mark and an address of the inputs to be fetched.

Line 22 includes the body of instructions, namely change of state which increments count.

Line 23 includes the closing boundary 110/[I].

In this example, the interrupt is generated by the leading edge of a signal generated by the sensing of the presence of one of a plurality of objects being counted.

From the foregoing description, it will be apparent that modifications can be made to the apparatus and method for using same without departing from the teachings of the present invention. For example, instead of updating the output status sections at the end of the program execution of all the enabled interrupt zones, one could update the output status section after executing each enabled interrupt zone. Also instead of coupling only the altered output data to the output devices, one could couple (output) all the data to the output devices.

Accordingly, the scope of the invention is only to be limited as necessitated by the accompanying claims.

We claim:

1. A programmable control device for controlling the outputs to a plurality of output devices relative to inputs and for synchronizing selected outputs with the occurrence of an external event, said control device comprising:

data processing means including memory means;

a user ladder program in said memory means;

said user ladder program having at least one interrupt zone which has a program therein that is not executed during normal ladder program executed and which is responsive to an interrupt signal generated by the happening of an external event to provide high speed response to the happening of such external event.

2. The control device of claim 1 wherein said interrupt zone has an opening boundary and a closing boundary.

3. The control device of claim 2 wherein said opening boundary includes addresses of the inputs associated with the interrupt zone.

4. The control device of claim 1 wherein said interrupt zone includes means for enabling said interrupt zone.

5. The control device of claim 1 wherein said interrupt zone includes a body of ladder type instructions.

6. The control device of claim 1 further including interrupt circuit means for generating said interrupt signal responsive to the happening of such external event and comprising means for sensing a transition.

7. The control device of claim 1 wherein said interrupt zone comprises enabling means, an opening boundary, addresses of inputs to be fetched, a body of instructions, and a closing boundary.

8. A method for operating a programmable controller which executes a ladder program and which provides high speed response in controlling outputs to a plurality of output devices relative to inputs by synchronizing selected outputs with the occurrence of an external event, said method comprising:
   providing data processing means;
   providing a user ladder program in said data processing means;
   providing in said user ladder program at least one interrupt zone which has a program therein that is not executed during normal ladder program execution and which is responsive to an interrupt signal; and
   providing interrupt means operable upon the occurrence of the external event to generate an interrupt signal.

9. A method for operating a programmable controller which executes a ladder program to control outputs in response to inputs, said methods including the steps of:
   providing data processing means;
   providing a user ladder program;
   installing said user ladder program in said data processing means;
   providing an interrupt zone in the user ladder program;
   selecting instructions in a program which is not executed during normal ladder program execution and which are to reside in the interrupt zone;
   placing such instructions in the interrupt zone;
   making the interrupt zone responsive to an interrupt signal generated by the happening of an external event;
   providing an opening boundary before the selective instructions; and
   providing a closing boundary after the selective instructions.

10. A method for operating a programmable controller including controlling the outputs to a plurality of output devices relative to inputs and for synchronizing selected outputs with the occurrence of an external event, said method comprising the steps of:
   providing a user ladder program having at least one interrupt zone which has a program therein that is not executed during normal ladder program execution and which is responsive to an interrupt signal generated by the happening of an external event;
   executing sequentially the instructions on rungs of the ladder program;
   generating an interrupt signal on the occurrence of an external event;
   immediately carrying out the instructions in said interrupt zone; and
   then returning to the execution of the instructions on the rungs of the ladder program.

* * * * *